United States Patent [19]
Jones et al.

[11] Patent Number: 5,366,544
[45] Date of Patent: Nov. 22, 1994

[54] ANTISTATIC LAYERS FOR PHOTOGRAPHIC ELEMENTS AND COATING COMPOSITIONS FOR PREPARING THE SAME

[75] Inventors: Raymond T. Jones, Webster; Jack J. Holt, Rochester, both of N.Y.

[73] Assignee: Eastman Kodak Company, Rochester, N.Y.

[21] Appl. No.: 67,895

[22] Filed: May 27, 1993

[51] Int. Cl.$^5$ .................... C09D 5/24; C09D 101/12
[52] U.S. Cl. .................................. 106/187; 252/519
[58] Field of Search ............... 106/187, 189, 195, 196; 252/519

[56] References Cited

U.S. PATENT DOCUMENTS

| | | | |
|---|---|---|---|
| 3,091,541 | 5/1963 | Rowley | 106/187 |
| 3,359,126 | 12/1967 | Barbre | 106/187 |
| 4,043,824 | 8/1977 | Wagar | 106/195 |
| 4,203,769 | 5/1980 | Guestaux | 430/631 |
| 5,009,812 | 4/1991 | Finter et al. | 252/519 |

*Primary Examiner*—David Brunsman
*Attorney, Agent, or Firm*—Robert A. Gerlach

[57] ABSTRACT

A coating composition for applying a vanadium pentoxide antistatic layer on a photographic element comprising from about 0.02 to about 0.08 percent by weight of vanadium pentoxide, from about 0.04 to about 1.6 percent by weight of a cellulose acetate binder polymer, said binder polymer having an acetyl content of from about 15 percent to about 35 percent by weight and the balance a solvent mixture of from 7.5 to 70 percent by weight of a $C_1$–$C_2$ dialkyl ketone, from 10 to 60 percent by weight of a $C_1$–$C_4$ alkanol and from 3 to 50 percent of water based on the weight of the solvent mixture.

12 Claims, No Drawings

ANTISTATIC LAYERS FOR PHOTOGRAPHIC ELEMENTS AND COATING COMPOSITIONS FOR PREPARING THE SAME

BACKGROUND

1. Field of the Invention

This invention relates to conductive coating compositions for preparing antistatic layers and to photographic elements containing such antistatic layers. More particularly, the invention relates to conductive coating compositions employing vanadium pentoxide, $V_2O_5$, having an increased solution stability, coatability, short drying times and a transparent uniform appearance.

2. Description of Related Art

U.S. Pat. No. 4,203,769 issued May 20, 1980 relates to antistatic layers prepared by coating vanadium pentoxide with an acetone/methanol aqueous coating vehicle utilizing cellulose acetate as a binder. Following the teaching of this patent, vanadium pentoxide antistatic layers have been used to protect films against static charge buildup for a number of years. A problem that exists with regard to the coating compositions containing vanadium pentoxide is that the vanadium pentoxide is precipitated by ionic materials, thus limiting the selection of the binder for the antistatic layer. While cellulose triacetate generally has satisfactory performance with respect to the binder employed in vanadium pentoxide antistatic layers, the coating compositions have a very low solution stability and therefore must be prepared and used substantially immediately in order to achieve satisfactory antistatic layers. When these coating compositions are not utilized immediately, the vanadium pentoxide precipitates and cannot be coated.

Therefore, there is a need for a coating composition for use in applying vanadium pentoxide antistatic layers that has an ample stability for a minimum of 24 hours.

SUMMARY OF THE INVENTION

The invention contemplates a coating composition for applying a vanadium pentoxide antistatic layer on a support comprising from about 0.02 to about 0.08 percent by weight of vanadium pentoxide, from about 0.04 to about 1.6 percent by weight of a cellulose acetate binder polymer, said binder polymer having an acetyl content of from about 15 percent to about 35 percent by weight and the balance solvent mixture of from 7.5 to 70 percent by weight of a $C_1$-$C_2$ dialkyl ketone, from 10 to 60 percent by weight of a $C_1$-$C_4$ alkanol and from 3 to 50 percent of water based on the weight of the solvent mixture. The solution stability of the coating compositions are greatly increased. Also, coatability is improved, shorter drying times are obtained and more uniform transparent coatings having improved conductivity result.

DESCRIPTION OF PREFERRED EMBODIMENTS

As indicated previously, vanadium pentoxide ($V_2O_5$) while being a highly conductive metal oxide, is easily precipitated from aqueous solutions and even more readily when organic solvents are present. So long as the vanadium pentoxide, binder and solvent mixture for applying the antistatic layer to a substrate is utilized substantially immediately upon mixing, no problem is encountered. However, in most cases this is not practical and a pot life or shelf life without the occurrence of precipitate for a period of at least 24 hours is necessary in most cases.

It has been determined that the above-stated advantages are achieved when a solvent mixture of a dialkyl ketone having alkyl groups of one or two carbon atoms, an alkanol having from one to four carbon atoms and water are employed, in the amounts by weight of from 7.5 to 70 percent, 10 to 60 percent and 3 to 50 percent respectively, based on the weight of the solvent mixture. The binder is a cellulose acetate polymer having an acetyl content less than 35 percent by weight and preferably from about 15 to about 32 percent by weight. The binder is employed in an amount of from 0.04 to 1.6 percent by weight of the coating composition. The coating composition also contains 0.02 to 0.08 percent by weight of vanadium pentoxide. Such coating compositions have a shelf life greater than 24 hours and can be coated onto a support without the precipitation of the vanadium pentoxide taking place. It is preferred that the dialkyl ketone be employed in an amount of from 30 to 40 percent, that the alkanol be employed in an amount of from 30 to 40 percent and water in an amount of from 20 to 30 percent based on the weight of the three part coating vehicle solvent mixture. Most preferably, the dialkyl ketone alcohol and water should be employed in amounts of about 37–38/36–38/24–26 percent respectively.

In the preparation of the coating compositions in accordance with this invention, from 0.02 to 0.08 percent by weight of vanadium pentoxide is mixed with from 0.04 to 1.6 percent by weight of a cellulose acetate binder polymer having an acetyl content less than 35 percent by weight based on the weight of the cellulose acetate and the balance a solvent mixture as described above. This coating composition is permitted to stand until precipitation of the vanadium pentoxide occurs. With compositions in accordance with this invention, solution stability is greater than 24 hours and in many cases greater than 72 hours. When cellulose acetate having an acetyl content greater than 35 percent by weight is employed, the coating compositions are not nearly as robust and the percentages of the three types of solvents employed must be controlled between very narrow limits to prevent the precipitation of the vanadium pentoxide even over short periods of time.

In the solvent mixture, any suitable $C_1$ or $C_2$ dialkyl ketone may be employed such as, for example, acetone, methyl ethyl ketone or diethyl ketone. Any suitable $C_1$ to $C_4$ alkanol may be employed such as, for example, methanol, ethanol and propyl alcohol, isopropyl alcohol, n-butanol, isobutanol or tertiary butanol. It is preferred to employ acetone and methanol along with the requisite quantity of water as the three component solvent mixture.

In a preferred embodiment in accordance with this invention, the vanadium pentoxide antistat layer is overcoated with a barrier layer comprising cellulose acetate having an acetyl content greater than 35 percent by weight based on the weight of the cellulose ester. Preferably, up to 75 percent by weight of cellulose nitrate based on the total weight of the cellulose acetate and cellulose nitrate may be employed. Preferably, the cellulose nitrate should be added in an amount up to about 25 percent by weight.

The barrier layer is applied from a solvent solution of the cellulose acetate or mixture of cellulose acetate and cellulose nitrate to the vanadium pentoxide antistat layer. The solvent employed is a ketone which is any one of those suitable in applying the antistat layer mentioned above. The ketone is employed in an amount of from 30 to 100 percent and when less than 100 percent, the remainder is an alcohol which is any of those previously mentioned with regard to the deposition of the antistat layer. Preferably, the alcohol mixture should contain from 40 to 60 percent by weight of the ketone with the balance being alcohol. Most preferably, the solvent mixture employed in the preparation of the barrier layer is a 50/50 percent by weight mixture of ketone and alcohol and of the materials mentioned above, for the deposition of this layer, acetone and methanol are preferred.

In the preparation of photographic elements utilizing the coating composition in accordance with this invention, any suitable film base commonly known in the art may be employed, such as, for example, cellulose triacetate, polyethylene terephthalate, polynaphthalene terephthalate, polycarbonate, paper, polystyrene, polyamides, polymers of vinyl chloride, polyvinyl acetyl, homo and copolymers of olefins such as polyethylene and polypropylene and the like.

Photographic elements having an antistat layer in accordance with the invention generally comprise at least one light-sensitive layer, such as a silver halide emulsion layer on the photographic film support on the opposite side from the antistat layer. This layer may be sensitized to a particular spectrum of radiation with, for example, a sensitizing dye, as is known in the art. Additional light-sensitive layers may be sensitized to other portions of the spectrum. The light-sensitive layers may contain or have associated therewith dye-forming compounds or couplers. For example, a red-sensitive emulsion would generally have a cyan coupler associated therewith, a green-sensitive emulsion would be associated with a magenta coupler, and a blue-sensitive emulsion would be associated with a yellow coupler. Other layers and addenda, such as subbing layers, surfactants, filter dyes, protective layers, barrier layers, overcoat layers, development inhibiting releasing compounds, and the like can be present in photographic elements of the invention, as is well-known in the art. Detailed description of photographic elements and their various layers and addenda can be found in the above-identified *Research Disclosure* 17643 and in James, *The Theory of the Photographic Process*, 4th, 1977.

Photographic elements suitable for use in combination with antistat layers in accordance with this invention are disclosed in *Research Disclosure* 22534, January 1983. Further, the light-sensitive elements disclosed in U.S. Pat. No. 4,980,267, fully incorporated herein by reference, are particularly applicable to protection by the overcoat layers in accordance with this invention.

The invention will be further illustrated by the following examples in which part and percentages are by weight unless otherwise specified:

EXAMPLE 1

About 0.05 $V_2O_5$ in 37.5% acetone, 37.5% methanol and 25% water and about 0.1 percent cellulose acetate having an acetyl content of 32% is coated on a polyethylene terephthalate film support. Resistivity of the resulting antistat layer is $10^8$ ohm/sq.

EXAMPLE 2

The procedure of Example 1 is repeated using half the concentration of the $V_2O_5$ and cellulose acetate. The resistivity of the resulting antistat layer is the same as in Example 1.

EXAMPLE 3

The procedure of Example 1 is repeated using a cellulose triacetate film base. The resistivity of the antistat layer is $10^7$ ohms/sq.

EXAMPLE 4 (a-e)

The procedure of Example 3 is repeated altering the water concentration in the solvent mixture in accordance with that set forth in Table I. Each antistat layer (4, a-e) is overcoated with a barrier layer of a 3/1 mixture of a cellulose acetate having an acetyl content of 39.8 percent by weight and cellulose nitrate.

In each case, Taber abrasion is measured. The results of this example are set forth in Table I.

TABLE I

| Example No. | $H_2O$ by Weight | Taber Abrasion % Haze |
| --- | --- | --- |
| 4,a | 3 | 33 |
| 4,b | 7 | 35 |
| 4,c | 13 | 29 |
| 4,d | 20 | 16 |
| 4,e | 25 | 16 |

The reduction in Taber by increasing the $H_2O$ content in the antistat layer is quite unexpected in abrasion resistance of the combined layers.

EXAMPLE 5

A cellulose triacetate film support of Example 4d having an antihalation layer on the other side is coated on the antihalation layer with the following layers in sequence (coverages are in grams per meter squared):

Slow Cyan Dye-Forming Layer

This layer comprises a blend of red-sensitized, cubic, silver bromoiodide emulsion (1.5 mol percent iodide) (0.31 $\mu$m grain size) (1.16 g/m$^2$) and red-sensitized, tabular grain, silver bromoiodide emulsion (3 mol percent iodide) (0.75 $\mu$m diameter by 0.14 $\mu$m thick) (1.31), Compound J (0.965), Compound F (0.011), Compound L (0.65) and gelatin (2.96).

Fast Cyan Dye-Forming Layer

This layer comprises a red-sensitized, tabular grain silver bromoiodide emulsion (6 mol percent iodide) having a diameter of 1.40 $\mu$m and a thickness of 0.12 $\mu$m (0.807), Compound J (0.102), Compound K (0.065), Compound L (0.102) and gelatin (1.506).

Interlayer

This layer comprises Compound F (0.054), an antifoggant and gelatin (1.291).

Slow Magenta Dye-Forming Layer

This layer comprises a blend of green-sensitized tabular grain silver bromoiodide emulsion (3 mol percent iodide) (grain diameter 0.55 $\mu$m and thickness 0.08 $\mu$m) (0.473) and tabular grain silver bromoiodide emulsion (3 mol percent iodide) (grain diameter 0.52 and thickness 0.09 $\mu$m) (0.495), Compound G (0.161), Compound I (0.108) and gelatin (2.916).

Fast Magenta Dye-forming Layer

This layer comprises a blend of green-sensitized tabular grain silver bromoiodide emulsion (3 mol percent iodide) (grain diameter 1.05 μm and thickness 0.12 μm) (0.536) and tabular grain silver bromoiodide emulsion (3 mol percent iodide) (grain diameter 0.75 μm and thickness 0.14 μm), Compound G (0.258), Compound H (0.054) and gelatin (1.119).

Interlayer

This layer comprises Carey-Lea Silver (0.43), Compound F (0.054), an antifoggant and gelatin (0.861).

Slow Yellow Dye-Forming Layer

This layer comprises a blend of blue-sensitized tabular grain silver bromoiodide emulsions (3 mol percent iodide) (grain diameter 0.57 μm and thickness 0.12 μm) (0.274) and blue-sensitive silver bromoiodide emulsion (0.3 mol percent iodide) (grain diameter 0.52 μm and thickness 0.09 μm) (0.118), Compound C (1.022), Compound D (0.168) and gelatin (1.732).

Fast Yellow Dye-Forming Layer

This layer comprises a blue-sensitized tabular grain silver bromoiodide emulsion (3 mol percent iodide) (grain diameter 1.10 μm and thickness 0.12 μm) (0.43), Compound C (0.161), Compound D (0.054), Compound E (0.003) and gelatin (0.791).

UV Absorbing Layer

This layer comprises silver halide Lippmann emulsion (0.215), Compound A (0.108), Compound B (0.106) and gelatin (0.538).

Overcoat

This layer comprises polyvinyl toluene matte particles coated with colloidal silica (0.038) and gelatin (0.888)

The thus prepared photographic film is perforated in 35 mm format, exposed in a 35mm camera and processed in a standard photofinishing processor. The resistivity of the antistat layer, after processing is unchanged from that reported in Example 3.

The structures of the above-designated Compounds A through L are as follows:

A:

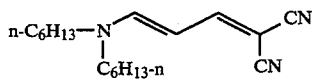

B:

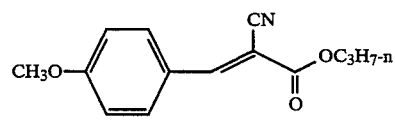

C:

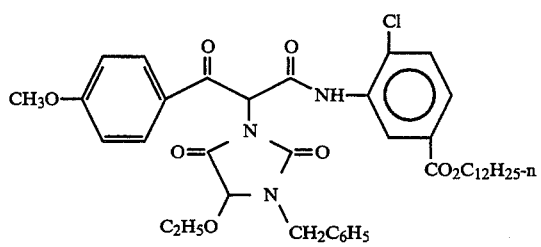

D:

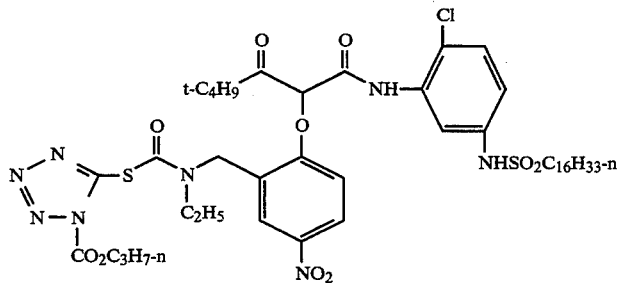

E:

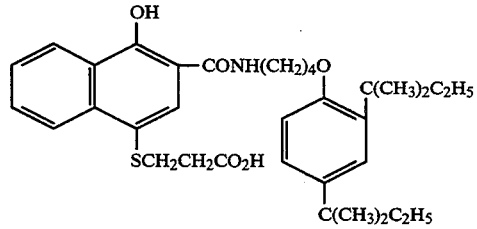

F:

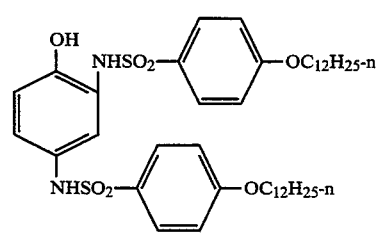

G:

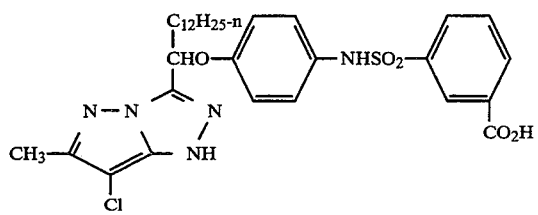

H:

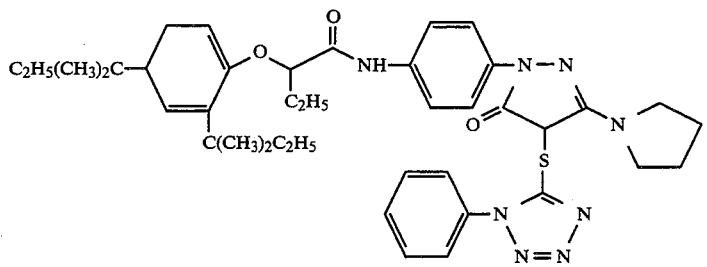

I: J:

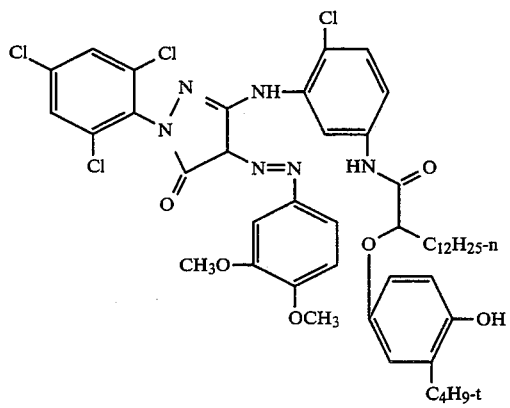 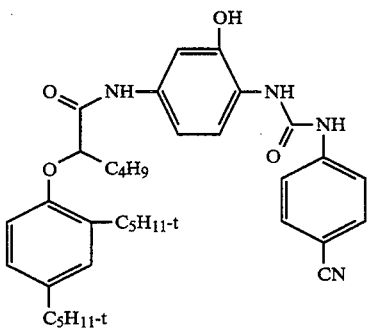

K: L:

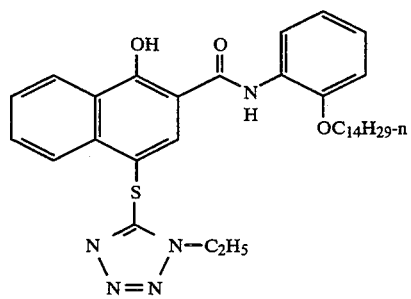 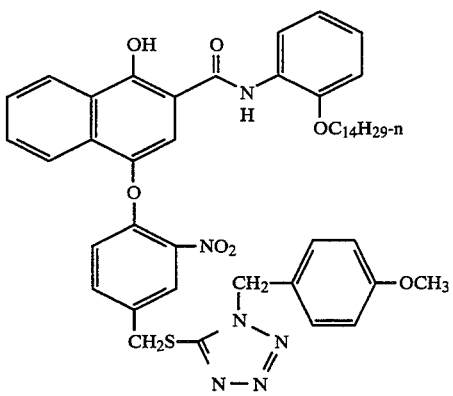

We claim:

1. A coating composition for applying a vanadium pentoxide antistatic layer on a photographic element comprising from about 0.02 to about 0.08 percent by weight of vanadium pentoxide, from about 0.04 to about 1.6 percent by weight of a cellulose acetate binder polymer, said binder polymer having an acetyl content of from about 15 percent to about 35 percent by weight and the balance a solvent mixture of from 7.5 to 70 percent by weight of a $C_1$-$C_2$ dialkyl ketone, from 10 to 60 percent by weight of a $C_1$-$C_4$ alkanol and from 3 to 50 percent of water based on the weight of the solvent mixture.

2. The coating composition of claim 1 wherein the dialkyl ketone is acetone.

3. The coating composition of claim 1 wherein the dialkyl ketone is methylethyl ketone.

4. The coating composition of claim 1 wherein the alkanol is methanol.

5. The coating composition of claim 1 wherein the alkanol is ethanol.

6. The coating composition of claim 1 wherein the alkanol is butanol.

7. The coating composition of claim 1 wherein the solvent mixture is acetone, methanol and water.

8. The coating composition of claim 1 wherein the solvent mixture is acetone, ethanol and water.

9. The coating composition of claim 1 wherein the solvent mixture is methylethyl ketone and methanol and water.

10. The coating composition of claim 1 wherein the dialkyl ketone is present in the amount of 30 to 40% based on the mixture.

11. The coating composition of claim 1 wherein the alkanol is present in the amount of 30–40 weight percent based on the weight of the mixture.

12. The coating composition of claim 1 wherein the acetyl content of the cellulose acetate binder is 15 to 32% by weight.

* * * * *